United States Patent [19]

Capelle

[11] Patent Number: 4,728,278
[45] Date of Patent: Mar. 1, 1988

[54] APPARATUS FOR MONITORING DEVIATIONS IN THE DIMENSIONS OF A CONTINUOUSLY EXTRUDED PROFILE STRIP

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 37,235

[22] Filed: Apr. 10, 1987

Related U.S. Application Data

[62] Division of Ser. No. 770,231, Aug. 28, 1985, Pat. No. 4,680,152.

[30] Foreign Application Priority Data

Sep. 22, 1984 [DE] Fed. Rep. of Germany ....... 3434903

[51] Int. Cl.$^4$ .............................................. B29C 47/96
[52] U.S. Cl. .................... 425/131.1; 264/40.4; 425/140; 425/141; 425/145; 425/149
[58] Field of Search ............... 264/40.4, 40.6, 40.7, 264/171; 425/140, 141, 143, 144, 145, 149, 131.1

[56] References Cited

U.S. PATENT DOCUMENTS

| | | | |
|---|---|---|---|
| 2,382,177 | 8/1945 | Schanz | 425/131.1 |
| 4,038,531 | 7/1977 | Lee | 425/140 X |
| 4,097,566 | 6/1978 | Bertin et al. | 264/40.7 |
| 4,171,193 | 10/1979 | Rahlfs | 425/140 X |
| 4,233,255 | 11/1980 | Moon | 425/141 X |
| 4,425,289 | 1/1984 | Lee et al. | 425/141 X |

FOREIGN PATENT DOCUMENTS

2201631 8/1973 Fed. Rep. of Germany .

*Primary Examiner*—Charles Hart
*Attorney, Agent, or Firm*—Schwartz, Jeffery, Schwaab, Mack, Blumenthal & Evans

[57] ABSTRACT

A method for monitoring deviations in the dimensions of profile strips during production is disclosed, as is an apparatus suitable for carrying out the method. The profile strip is formed from one or more rubber or thermoplastics material mixtures which are fed from one or more extrusion devices through nozzles into a common nozzle in an extrusion head. Pressure and temperature measuring means measure the extrusion pressure and temperature of each mixture. The profile strip thus produced then passes over weighing device which measures its weight per unit length. The measured value is transmitted to a regulating or control device and compared with a desired weight per unit length. When a deviation is ascertained, the regulation or control device which is also operatively connected to the pressure and temperature means and to adjustable drives for each extrusion device, compared the measured extrusion pressure and temperature values with desired values and adjusts the drive of one or more of the extrusion devices to cause the measured pressure and temperature values, and hence the measured weight per unit length, to be restored to their desired values.

1 Claim, 1 Drawing Figure

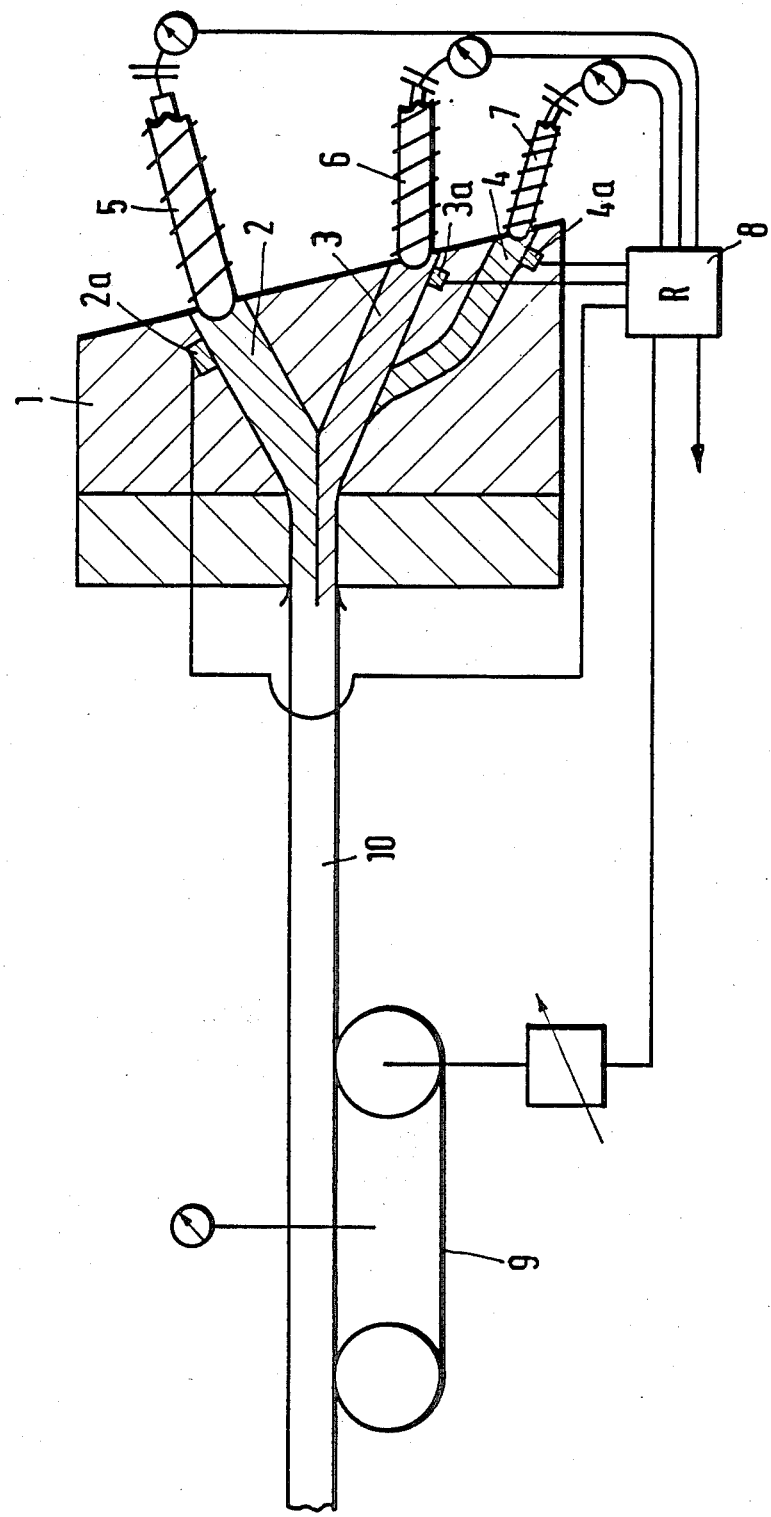

APPARATUS FOR MONITORING DEVIATIONS IN THE DIMENSIONS OF A CONTINUOUSLY EXTRUDED PROFILE STRIP

This application is a division, of application Ser. No. 770,231, filed Aug. 28, 1985, U.S. Pat. No. 4,680,152.

FIELD OF THE INVENTION

The present invention relates to a method for monitoring the production of continuously extruded profile strips and to an apparatus suitable for carrying out such a method. More particularly, the monitoring method and apparatus of the present invention are designed for use when the profile strips are formed from one or more mixtures of rubber or thermoplastics materials.

BACKGROUND OF THE INVENTION AND PRIOR ART DISCUSSION

The production of elongate profiles from one or more mixtures of rubber or thermoplastics materials utilising an extrusion head to which the mixture or mixtures are supplied by one or more extrusion devies is known. It is also known to cool the profile by conveying it through a cooling zone comprising a plurality of conveyor belts. An apparatus used for producing a profile in the form of a tread strip from two different rubber mixtures is disclosed in German Patent Specification No. 2 201 631. In such prior specification, two separate screw presses, which are disposed one above the other, feed different rubber mixtures to an extrusion head where the material mixtures are combined and extruded therefrom in the form of a tread strip. U.S. Pat. No. 2,382,177 also shows such an arrangement.

The extruded tread strip is then conducted over a tread strip weighing device. Such weighing is achieved by weighing the amount of material located on a rotating conveyor belt. The desired weight of the tread strip is known and if the actual weight deviates therefrom, a certain degree of correction can be achieved. Thus, if the actual weight is higher than the desired weight, the rate of transfer of the tread strip can be increased. This effectively causes a weight reduction to be achieved because the strip is elongated.

In practice, therefore, such apparatuses for producing tread strips have been operated at discharge rate which is slightly in excess of a desired rate. The extruded tread strip is then brought to its desired weight as a result of the elongation.

The only regulation of the characteristics of the tread strip profile offered by such an arrangement is that the extruded tread strip can be elongated or compressed by increasing or reducing the rate of transfer of the strip. However, the rate at which the tread strip is discharged from the nozzle must be considered as the minimum rate for the tread strip transfer apparatus and, for the purpose of regulating the profile thickness, it is vital that the rate of transfer does not fall below this minimum rate.

Simple regulation or control in this manner using a profile strip weighing device which effects a comparison with a desired weight is, in practice, too slow. If, for example, the weighing device ascertains that the tread strip is too heavy, a long piece of unusable tread strip has already been produced. Moreover, a considerable amount of profile material is wasted before the error is corrected.

However, a greater disadvantage resides in the fact that a profile strip weighing device only measures the sum of the extrusion coutputs and not the individual outputs of each extrusion device, If, for example, the extrusion device which extrudes the material which is to form the sidewall of a vehicle tire discharges too much material, the strip weighing device ascertains that too much material is present and the rate of transfer is increased.

It is true that, after some time, this causes the weight of the tread strip per unit length to return to its desired value. However, this is at the cost of reducing the amount of material extruded from the other extrusion device, which material forms the tread surface of the vehicle tire.

Accordingly, despite the fact that the tread strip has the desired overall weight per unit length, the ratio of the individual mixtures present therein vary considerably and this may cause the vehicle tire produced using such a tread strip to be considerably weakened.

Since tread strips for vehicle tires are usually formed from three or more different mixtures, merely ensuring that the tread strip has a desired weight per unit length by utilising a strip weighing device, even if operating satisfactorily cannot possibly ensure that the weight ratios of the individual mixtures present therein are correct.

It has therefore been necessary to attempt to find a way in which both the total weight of the tread strip and the quantities of the individual rubber mixtures from which it is made can be monitored and controlled.

U.S. Pat. No. 4,097,566 also discloses a method and apparatus for producing profiles formed from a plurality of mixtures. The profile strip emerging from the profile strip nozzle, in such prior art arrangement passes a thickness measurement device and is then fed to a conveyor belt after a 90° change in the direction of movement of the strip. The width of the deflection loop of the profile strip is measured. After passing a compensating roller, the profile strip is then guided through a device which measures its weight per unit length and onto a conveyor belt. The conveyor belt is located downstream of the weighing device and the speed of the belt is controllable. By altering the speed of the conveyor belt in dependence upon the weights which have been ascertained, modifications of the strip are caused to occur. Thus, if the measured weight is too high, the profile strip is caused to be elongated by the conveyor belt and if too low, the strip is compressed by the conveyor belt, so that, in either case, the desired weight per unit length of the strip is attained. the method which is described therein is highly complex having regard to the regulatng techniques employed and, additionally, has one funamental disadvantage. If, for example, one of the weighing devices or one of the measuring devices used for measuring the width of a deflection loop ascertains that the produced profile does not have the desired dimensions, adjustment can still only be effected by either extending or compressing the profile strip which is formed from two mixtures.

Each extension or elongation operation on the profile strip, produced, for example, by accelerating the conveyor belts, provides the profile strip with the correct weight but with totally inaccurate and uncontrolled dimensions. These prove to be weak points in later use.

An additional disadvantage of such a known arrangement resides in the fact that the apparatus used is very long. Accordingly, from the time when the deviation from the desired weight of the profile strip is ascertained to the time of its correction, a large amount of unusable material has passed through the apparatus. This is because a large amount of profile strip passes between the particular measuring point and the source of error, that is to say, the point of deviation from the desired value. Such profile strip portion is, therefore, useless.

OBJECTS OF THE INVENTION

The present invention seeks to provide a method and apparatus whereby the disadvantages of the above-described methods and apparatuses are overcome. In particular, the present invention seeks to ensure not only that deviations from the desired weight or dimensions of the overall profile strip but also of the component parts of the profile strip when it is made from more than one mixture, can be corrected very rapidly so that the minimum length of the profile is wasted.

In order to achieve such an aim, it is clear that actual physical action upon the profile strip which has been produced is totally unsuitable. Thus, as mentioned hereinbefore, elongation of the profile strip is an unsuitable way for correcting deviations in the thickness because each extension or pulling operation results in uncontrollable regressive shrinkage phenomena as the profile cools.

SUMMARY OF THE INVENTION

According to the present invention, there is provided a method of monitoring deviations in the dimensions of a continuously extruded profile strip formed from one or more mixtures of rubber or thermoplastics material, comprising the steps of extruding each mixture into a common profile strip nozzle at a controlled feed rate for each mixture, measuring the individual extrusion pressures and temperatures of the mixtures as they pass into the nozzle, extruding th profile strip and continuously measuring the weight per unit length of the extruded profile strip wherein the measured weight per unit length of the profile strip is compared with a desired weight per unit length and w en a difference is observed, comparing the particular extrusion pressures and/or temperatures of the mixtures with desired values therefor and, if such measured values also deviated from the desired values, adjusting the feed rate of the particular mixture having the deviant pressure and/or temperature value so that the desired value or values are reached.

Also according to the present invention, there is provided an apparatus for monitoring deviations in the dimensions of a continuously extruded profile strip comprising one or more extrusion devices, each extrusion device extruding one mixture to be used in forming the profile strip and being connected to a common profile strip nozzle, each extrusion device having an adjustable drive and being provided with a measurement device in its discharge nozzles for measuring the extrusion pressure and/or temperature of the material leaving the extrusion device, a weighing device being disposed downstream of the profile strip nozzle for measuring the weight per unit length of the strip produced, wherein the weighing device is operatively connected to a regulating or control device, the regulating or control device also being operatively connected to the measurement devices for measuring the extrusion pressures and/or temperatures and to the adjustable drive of each extruder wherby the measured weight, pressure and temperature values are compared, in the regulating or control device with desired values and, if deviations are observed, the regulating or control device acts on the adjustable drive of at least one appropriate extruder drive.

By checking the particular extrusion pressure and/or temperatures of each of the individual mixtures, for example, as each mixture reaches the inlet end of the multiple nozzle used for producing the profile strip, the quantities of material supplied by each individual extrusion device are ascertained. Accordingly, if the ascertained weight per unit length of the profile strip differs from the desired weight per unit length, it is possible that at least one of the pressures and/or temperatures measured differs from the desired values and the feed rates of the particular extrusion device concerned can be modified.

This arrangement permits the measured weight per unit length of the profile strip to be restored to the desired value. In other words, the percentage of each component mixture in the profile strip is returned to its desired percentage, because it is these deviations in the percentages of the components which are responsible for the deviations in the overall weight per unit length of the profile strip. This measure ensures, therefore, that the desired percentages of material in the profile are strictly observed, without the need for any physical action to be effected upon the already extruded profile. Any such physical action, as mentioned hereinbefore, gives rise to known disadvantages, such as uncontrollable regressive shrinkage when the strip is cooled if the profile strip has previously been stretched so to achieve a reduction in weight per unit length.

If the weighing device ascertains deviations from the desired weight, both the pressure and the temperature at the outlets of the individual extrusion devices can be measured. However, it is possible to check only the pressures. If, for example, a slight drop in pressure is ascertained at one extrusion device and the desired weight per unit length is also too low, this indicates that this extrusion device is conveying slightly less material than should be the case. A slight increase in the rate of drive of the screw of this extrusion device raises the quantity of material fed by the device which restores the weight per unit length of the profile strip to its desired value.

Better and more reliable results are obtained however if the temperatures are also checked at the outlet apertures of the individual extrusion devices or at the nozzle inlet in addition to the pressures. By checking the temperatures as well as the pressures, viscosity of the mixtures in the individual extrusion devices is also taken into consideration.

If, for example, because of an increase in the desired weight per unit length a rise in temperature may be ascertained at an extrusion device without a drop in pressure being observed this is because of the reduced viscosity of the material. Such a situation indicates that this particular extrusion device is conveying too much material. When there is an increase in temperature, the material viscosity decreases slightly, as does the pressure at the measuring point. Since no drop in pressure is recorded, it must be assumed that there is a slightly increased conveyance of material in this particular extrusion device. In other words the decrease in the material viscosity, caused by the rise in temperature, is compensated by the increased throughput of the extrusion device.

Deviations from the desired weight per unit length are measured and transmitted to a device which compares the measured value with a desired value. Any deviations are transmitted to a regulating or control means such as a microprocessor. The microprocessor is programmed in such a manner that, when such a weight deviation is recorded, the values of the temperatures and/or material pressures are immediately checked at the inlets of the nozzle or at the screw tip outlet of the extrusion devices by suitable temperature and pressure scanning means and are compared with the desired values.

If the regulating means then ascertains that the measured value at one of the points for monitoring the pressure and/or temperature deviates from the desired value, the regulating means acts upon the drive of the extrusion device having the monitoring point providing the deviant measurement.

The regulating means may be so programmed that, for example, if a pressure deviation of 0.5 bar below the desired value is observed the rate of rotation of the screw of the particular extrusion devices is increased by two revolutions per minute.

This act causes the particular extrusion device to convey slightly more material. The material pressure at the nozzle inlet will thus be increased by, for example, 0.5 bar so as to return to the predetermined desired value. Simultaneously, by slightly increasing the feed output of this extrusion device, the weight per unit of the profile strip increases again to the desired value, as can be ascertained by comparing the desired and the new actual values recorded by the weighing device.

This arrangement permits the weight per unit length of the extruded profile strip, which is formed, for example, from three different mixtures to be restored to the desired value without any direct physical action on the already extruded profile strip being undertaken.

BRIEF DESCRIPTION OF THE DRAWING

One embodiment of an apparatus in accordance with the present invention will be further described, solely by way of example, with reference to the accompanying drawing, the single FIGURE of which shows a schematic view of an apparatus comprising three extrusion devices and a regulating or control circuit.

DESCRIPTION OF PREFERRED EMBODIMENTS

In the Figure there is shown a multiple extrusion head 1 suitable for producing, for example, tread strips for vehicle tires. The head 1 is fedthrough three nozzles 2, 3 and 4 with different rubber mixtures, such mixtures being supplied to the nozzles 2, 3 and 4 by three separate extrusion devices 5, 6 and 7 respectively.

In the region in which the mixtures enter the nozzles 2, 3 and 4, measuring devices 2a, 3a and 4a are provided for measuring the pressure and temperature at these locations.

Each of these measuring devices 2a, 3a and 4a is dconnected to a regulating or control device 8, such as a microprocessor. Desired pressure and temperature value can be set in the regulating or control device 8 and the values ascertained by the devices 2a, 3a and 4a can be compared therewith.

The extrusion devices 5, 6 and 7 are, obviously, driven and their drives are connected to the regulating or control device 8 through the intermediary of connections 5a, 6a and 7a respectively. By so doing, the device 8 can be utilised for modifying the particular rate of rotation of the screw in each of the extrusion devices. Moreover, a desired rate of rotation of the screw in each extrusion device can be set in the regulating or control device 8 and the actual rotational rates ascertained compared therewith.

A tread strip 10, which is formed from the three mixtures, is extruded from the multiple extrusion head 1 and passes over a weighing device 9. The weighing device 9 is also connected to the regulating or control device 8 and a predetermined desired weight of the tread strip per unit length can be set in the regulating or control device 8. Such desired weight can be altered if necessary. The actual weight per unit length of the strip can be compared with the desired weight in the regulating or control device 8, which detects any deviation. Thus, for example, too low a weight per unit length indicates that too little material is being extruded from at least on of the nozzles 2, 3 and 4.

Deviations from predetermined desired values of the pressure and temperature in the extrusion devices 5, 6 and 7 are likewise detected by the measuring devices 2a, 3a and 4a and are transmitted to the regulating or control device 8.

If, for example, the weight per unit length determined by the weighing device 9 is ascertained as being too low by the regulating or control device 8, the regulating device 8 monitors the pressure and temperature values in the individual nozzles 2, 3 and 4 and compares them with the desired values.

If the regulating device 8 then ascertains that, for example, the pressure and the temperature in the nozzle 2 have droped, this indicates that the extrusion device 5 is conveying less material then the prescribed amount. Accordingly, the tread strip, which is produced from all three mixtures, will have a lighter weight per unit length.

The temperature must also be ascertained because, with an increase in temperature, the material viscosity drops. In other words, the material becomes more fluid and the measured pressure of the material will drop although the quantity of material being conveyed does not decrease. In consequence, the weighing device does not ascertain any change in weight per unit length. However, if the scanned pressure drops without the temperature rising, this definitely indicates that the quantity of material conveyed through the screw of the extrusion device has decreased.

If, therefore, the scanned value for both the pressure and the temperature drop by at least a predetermined extent relative to the desired values, and such changes are ascertained by the regulating device, the rate of rotation of the appropriate screw is adjusted by the device 8. The actual pressure and temperature vales which are ascertained are both taken into account by the regulating or control device 8 for control purposes.

The weight per unit length of the tread strip produced is, of course, lowered by an amount which corresponds to the amount of underfeed of the material by the extrusion device 5. Because both the weight per unit length of the tread strip and the pressure and the temperature, measured by measuring means 2a, in the nozzle 2 fed by the extrusion device 5 are too low, the regulating device 8 accordingly increases the rate of rotation of the screw in the extrusion device 5 by, for example, 1.5 revolutions per minute. The output from the extrusion device 5 is thus slightly increased. Such an increase is continued until the predetermined desired pressure and temperature in the nozzle 2, and hence the weight per unit length of the tread strip 10 has been restored.

After leaving the weighing device 9, the tread strip 10 passes through a shrinkage path (not shown) which may comprise two inclinedly disposed roller paths. Thereafter, the strip passes through a cooling path to a cutting device wherein it is cut to length.

I claim:

1. Apparatus for monitoring deviations in the weight per unit length of a profiled strip formed by feeding together and extruding a plurality of separately extruded mixtures into a common profile strip, comprising:
    (a) a profile strip extruding nozzle to which said mixtures are fed,
    (b) means for measuring the extrusion pressure and temperature of each mixture after being separately extruded and before the strip is extruded by the strip extruding nozzle,
    (c) a control device for storing the desired pressure and temperature values of each mixture, the desired weight per unit length value of the profile strip, and the desired percentages of mixtures comprising the strip,
    (d) means for simultaneously feeding each mixture to the strip extruding nozzle to produce an extruded profile strip comprises of said mixtures,
    (e) means for continuously weighing the extruded profile strip to determine the weight per unit length of the profile strip,
    (f) said control device comparing the actually determined weight per unit length of the strip with the stored desired weight per unit length, and determining the variation, comparing the actually measured pressure and temperatures of each mixture with the corresponding control value for each such mixture, and determining the variation, and adjusting the feed rate of one or more of said mixtures where deviations exist,
whereby the desired percentages of mixtures are reestablished an the measured weight per unit length of the strip is made equal to the desired weight per unit length of the strip.

* * * * *